United States Patent
Al-Kutti et al.

(10) Patent No.: US 10,221,097 B1
(45) Date of Patent: Mar. 5, 2019

(54) DATE PALM ASH BASED CEMENT COMPOSITIONS

(71) Applicant: Imam Abdulrahman Bin Faisal University, Dammam (SA)

(72) Inventors: Walid Al-Kutti, Dammam (SA); A. B. M. Saiful Islam, Dammam (SA); Muhammad Nasir, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 15/690,890

(22) Filed: Aug. 30, 2017

(51) Int. Cl.
*C04B 14/04* (2006.01)
*C04B 14/06* (2006.01)
*C04B 28/04* (2006.01)

(52) U.S. Cl.
CPC ............ *C04B 28/04* (2013.01); *C04B 14/041* (2013.01); *C04B 14/06* (2013.01); *C04B 2201/52* (2013.01)

(58) Field of Classification Search
CPC ....... C04B 28/04; C04B 14/041; C04B 14/06; C04B 2201/52
See application file for complete search history.

(56) References Cited

U.S. PATENT DOCUMENTS

| 4,105,459 A | 8/1978 | Menta |
| 2014/0284309 A1 | 9/2014 | Waters |

FOREIGN PATENT DOCUMENTS

| CN | 103539400 B | 8/2015 |
| CN | 105418013 A | 3/2016 |
| WO | 2012/115500 A1 | 8/2012 |
| WO | 2013/019100 A1 | 2/2013 |
| WO | 2013/151412 A1 | 10/2013 |

OTHER PUBLICATIONS

Al-Kutti. W., et al, "Potential Use of Date Palm Ash in Cement-based Materials", Journal of King Saud University—Engineering Sciences (2017), http://dx.doi.org/10.1016/j.jksues.2017.01.004, pp. 1-6.*
Awang, H., et al., "Strength of Sieved Only Oil Palm Ash Foamed Concrete", International Journal of Engineering and Technology, vol. 8, No. 5, pp. 354-357, (Oct. 2016).
Al-Mulali, M. Z., et al., "The Incorporation of Oil Palm Ash in Concrete as a Means of Recycling: A Review", Cement & Concrete Composites, vol. 55, pp. 129-138, (2015).
Karim, M.R., et al., "Strength of Concrete as Influenced by Palm Oil Fuel Ash", Australian Journal of Basic and Applied Sciences, vol. 5, No. 5, pp. 990-997, (2011).

* cited by examiner

*Primary Examiner* — Anthony J Green
(74) *Attorney, Agent, or Firm* — Oblon, McClelland, Maier & Neustadt, L.L.P.

(57) ABSTRACT

A concrete or mortar composition including (i) a cementitious binder material that contains Portland cement and 1-50 wt % date palm ash relative to the total weight of the cementitious binder material, (ii) a coarse aggregate, (iii) a fine aggregate, and (iv) water, wherein the cementitious binder material is present at 200-500 kg per $m^3$ of the concrete or mortar composition.

20 Claims, 6 Drawing Sheets

DATE PALM ASH BASED CEMENT COMPOSITIONS

STATEMENT REGARDING PRIOR DISCLOSURES BY THE INVENTORS

Aspects of this technology are described in an article "Potential use of date palm ash in cement-based materials" by Walid Al-Kutti, A. B. M. S. Islam, and Muhammad Nasir, in Journal of King Saud University—Engineering Sciences, 2017, https://doi.org/10.1016/j.jksues.2017.01.004, which is incorporated herein by reference in its entirety.

BACKGROUND OF THE DISCLOSURE

Technical Field

The present disclosure relates to concrete and/or mortar compositions that include a cementitious binder material that contains date palm ash, and concrete and/or mortar products made therefrom.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Infrastructure development has resulted in a boom of construction in the last few decades around the globe. In this time, cement consumption has become excessive [Gartner, E., 2004. Industrially interesting approaches to "low-$CO_2$" cements. Cem. Concr. Res. 34, 1489-1498,—incorporated herein by reference in its entirety] and the process of producing cement is highly energy consuming and more importantly it causes excessive emission of greenhouse gases (GHG) into the environment [Mo, K. H., Alengaram, U. J., Jumaat, M. Z., Yap, S. P., Lee, S. C., 2016. Green concrete partially comprised of farming waste residues: a review. J. Cleaner Product. 117, 122-138.; and Błaszczynski, T., Król, M., 2015. Usage of green concrete technology in civil engineering. Proc. Eng. 122, 296-301.—each incorporated herein by reference in its entirety]. It is estimated that the manufacturing of 1 ton of conventional cement releases almost the same amount of carbon dioxide ($CO_2$) into the atmosphere. It is estimated that about 40% of the total $CO_2$ emitted is emitted during combustion of fossil fuels in the kiln operation, the production process accounts for 50% of the $CO_2$ emission, and the remaining 10% of $CO_2$ emissions results from the transportation of cement [Imbabi, M. S., Carrigan, C McKenna, S., 2012. Trends and developments in green cement and concrete technology. Int. J. Sustain. Built Environ. 1, 194-216.; and Huda, M. N., Jumat, M. Z. B., Islam, A. B. M. S., 2016. Flexural performance of reinforced oil palm shell & palm oil clinker concrete (PSCC) beam. Constr. Build. Mater. 127, 18-25.—each incorporated herein by reference in its entirety]. In addition, every year millions of tons of industrial wastes are generated and the majority of these wastes are not utilized. These wastes often cause environmental issues due to storage problems and pollution. For example, local Saudi palm waste capacity has exceeded more than 400 million kg with a majority of farmers burning the waste. The annual growth of this waste is estimated to increase at a rate of 1.54%.

Using waste materials in concrete has led to considerable enhancements in concrete performance, pollution reduction, construction savings and working conditions [Ahmmad, R., Jumaat, M. Z., Bahri, S., Islam, A. B. M. S., 2014a. Ductility performance of lightweight concrete element containing massive palm shell clinker. Constr. Build. Mater. 63, 234-241.; Ahmmad, R., Jumaat, M. Z., Bahri, S., Islam, A. B. M. S., 2014b. Effect of water-cement ratios on oil palm shell (OPS) lightweight concrete for ecofriendly construction. Int. J. Adv. Comput. Sci. Appl. 4 (4), 246-249.; Jumaat, M. Z., Alengaram, U. J., Ahmmad, R., Bahri, S., Islam, A. B. M. S., 2015. Characteristics of palm oil clinker as replacement for oil palm shell in lightweight concrete subjected to elevated temperature. Constr. Build. Mater. 1 101, 942-951.; Amadi, A. A., Osub, A. S., 2016. Effect of curing time on strength development in black cotton soil—quarry tines composite stabilized with cement kiln dust (CKD). J. King Saud Univ. Eng. Sci. (in press).; and Ikponmwosa, A., Fapohunda, C., Kolajo, O., Eyo, O., 2015. Structural behaviour of bamboo-reinforced foamed concrete slab containing polyvinyl wastes (PW) as partial replacement of fine aggregate. J. King Saud Univ. Eng. Sci. (in press).—each incorporated herein by reference in its entirety]. To avoid or minimize pollution caused by the use of ordinary Portland cement (OPC) in concrete and to produce environmental friendly cementitious construction materials for sustainable development, a typical cementitious binder, named "geopolymer", has been developed for OPC substitution which may require alkali-activated palm oil fuel ash (POFA). The term "geopolymer" was first introduced by Davidovits et al which is an inorganic material having an abundance of silicon (Si) and aluminum (Al) [Davidovits, J., 2011. Geopolymer chemistry and applications. Institut Géopolymère, Saint-Quentin, France.—incorporated herein by reference in its entirety]. According to the United States Portland Cement Association, different types of cement production emits $CO_2$ in the following order based on tons of cement per tons of $CO_2$ emissions: (1) Portland cement=1.02, (2) Geo-polymer cement by slag manufacturing=0.308, (3) Geo-polymer cement by-product of slag=0.208 and (4) Fly ash-based cement=0.014 ton/ton, respectively [Blaszczynski, T., Krol, M., 2014. Concrete and problem of carbon dioxide emission reduction. Insulations 3, 28-30.—incorporated herein by reference in its entirety]. Further, Islam et al. computed the cost- and eco-efficiency of POFA by varying dosage up to 25% to OPC concrete and concluded that POFA based concrete performs better than traditional OPC concrete with 10% POFA inclusion providing the highest cost and eco-efficiency [Islam, M. M. U., Mo, K. H., Alengaram, U. J., Jumaat, M. Z., 2016. Mechanical and fresh properties of sustainable oil palm shell lightweight concrete incorporating palm oil fuel ash. J. Cleaner Product. 115, 307-314.—incorporated herein by reference in its entirety].

Several researchers also demonstrate that ash-based cementitious materials provide the same or better concrete characteristics as compared to ordinary Portland cement concrete, in addition to their environmental advantages [Mujah, D., 2016. Compressive strength and chloride resistance of grout containing ground palm oil fuel ash. J. Cleaner Product. 112, 712-722.; and Ozerkan, N. G., Ahsan, B., Mansour, S., Iyengar, S. R., 2013. Mechanical performance and durability of treated palm fiber reinforced mortars. Int. J. Sustain. Built Environ. 2, 131-142.—each incorporated herein by reference in its entirety]. For instance, Islam et al. studied the effect of POFA replacement (0-25%) and oil palm shell (OPS) on fresh and mechanical properties of lightweight concrete. They reported highest workability and compressive strength of concretes prepared with 10% POFA due to packing effect and pozzolanic reactivity, although there was reduction in the pulse velocity, split tensile strength, flexural strength and modulus of elasticity due to the weak interfacial zone between the POFA particles.

In terms of durability, Muja et al. evaluated the chloride ion penetration in grounded POFA based grout obtained from fruit bunches and kernels at replacement level of 0-40%, which cause a reduction of about 30% and 60% in charges passed through these grouts, respectively, due to the filler effect.

Previous studies involving palm trees have relied upon waste products POFA or OPS sourced mostly from Malaysia and Nigeria, with Malaysia being the largest palm oil producing country generating millions of tons of solid wastes known as palm oil fuel ash (POFA) which is disposed of annually by palm oil mills all over the country. It is a by-product obtained from burning the remaining of extracted palm oil fibers and shells in the palm oil mill. This ash, which does not have sufficient nutrients to be used as a fertilizer is dumped in open fields in the vicinity of the palm oil mills and thus has become a significant pollutant.

Even though the Kingdom of Saudi Arabia cultivates more than 300 types of Date Palm trees [Assirey, E. A. R., 2015. Nutritional composition of fruit of 10 date palm (*Phoenix dactylifera* L.) cultivars grown in Saudi Arabia. J. Taibah Univ. Sci. 9, 75-79.—incorporated herein by reference in its entirety], no research has been carried out by the local or international researchers in the area of construction and building infrastructure using date palm ash (PA).

In view of the forgoing, one object of the present disclosure is to provide concrete and/or mortar compositions that include a cementitious binder material that contains date palm ash, and concrete and/or mortar products made therefrom with advantageous properties.

BRIEF SUMMARY OF THE DISCLOSURE

According to a first aspect, the present disclosure relates to a concrete or mortar composition that includes (i) a cementitious binder material comprising Portland cement and 1-50 wt % date palm ash relative to the total weight of the cementitious binder material, (ii) a coarse aggregate, (iii) a fine aggregate, and (iv) water, wherein the cementitious binder material is present at 200-500 kg per m$^3$ of the concrete or mortar composition.

In one embodiment, the cementitious binder material contains 5-15 wt % of the date palm ash relative to the total weight of the cementitious binder material.

In one embodiment, the date palm ash contains 30-40 wt %/o SiO$_2$ relative to the total weight of the date palm ash.

In one embodiment, the date palm ash contains 10-15 wt % of CaO relative to the total weight of the date palm ash.

In one embodiment, the date palm ash contains 0.1-1.0 wt % of Fe$_2$O$_3$ relative to the total weight of the date palm ash.

In one embodiment, the date palm ash contains 5-10 wt % of MgO relative to the total weight of the date palm ash.

In one embodiment, the date palm ash contains 0.1-1.0 wt % of Al$_2$O$_3$ relative to the total weight of the date palm ash.

In one embodiment, the date palm ash has a specific gravity of 2.0-2.5.

In one embodiment, the date palm ash has a maximum particle size of less than 0.2 mm.

In one embodiment, the Portland cement is Ordinary Portland cement (OPC) Type I.

In one embodiment, the weight ratio of the fine aggregate to the coarse aggregate is in a range of 0.5-0.8.

In one embodiment, the coarse aggregate has particle size of 3-25 mm, and the fine aggregate has a particle size of less than 0.5 mm.

In one embodiment, the coarse aggregate is crushed limestone and the fine aggregate is dune sand.

In one embodiment, the weight ratio of the water to the cementitious binder material is 0.2-0.6.

In one embodiment, the cementitious binder material contains 5-15 wt % of the date palm ash relative to the total weight of the cementitious binder material, and has at least one selected from the group consisting of a) a 3 day compressive strength of 35-50 MPa after setting, (b) a 28 day compressive strength of 56-60 MPa after setting, and (c) a 360 day compressive strength of 83-90 MPa after setting.

In one embodiment, the cementitious binder material contains 5-15 wt % of the date palm ash relative to the total weight of the cementitious binder material, and has at least one of (a) a maximum initial rate of water absorption of 0.25-0.72 mm/s after setting and (b) a maximum secondary rate of water absorption of 1.75-2.25 mm/s after setting.

In one embodiment, the cementitious binder material contains 5-15 wt % of the date palm ash relative to the total weight of the cementitious binder material, and has an average chloride permeability of 2,000-3,500 coulombs after setting.

According to a second aspect, the present disclosure relates to a cured concrete or mortar product containing the composition disclosed herein, in one or more of its embodiments, in cured form.

In one embodiment, the cementitious binder material contains 5-15 wt % of the date palm ash relative to the total weight of the cementitious binder material, and has at least one of (a) a 3 day compressive strength of 35-50 MPa, (b) a 28 day compressive strength of 56-60 MPa, and (c) a 360 day compressive strength of 83-90 MPa.

In one embodiment, the cementitious binder material contains 5-15 wt % of the date palm ash relative to the total weight of the cementitious binder material, and has at least one of (a) a maximum initial rate of water absorption of 0.25-0.72 mm/s, (b) a maximum secondary rate of water absorption of 1.75-2.25 mm/s, and (c) an average chloride permeability of 2,000-3,500 coulombs.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Embodiments of the present disclosure will now be described more fully hereinafter with reference to the accompanying drawings, in which some, but not all of the embodiments of the disclosure are shown.

As used herein, the words "a" and "an" and the like carry the meaning of "one or more". Additionally, within the description of this disclosure, where a numerical limit or range is stated, the endpoints are included unless stated otherwise. Also, all values and subranges within a numerical limit or range are specifically included as if explicitly written out.

As used herein, the terms "optional" or "optionally" means that the subsequently described event(s) can or cannot occur or the subsequently described component(s) may or may not be present (e.g. 0 wt %).

The term "comprising" is considered an open-ended term synonymous with terms such as including, containing or having and is used herein to describe aspects of the invention which may include additional components, functionality and/or structure. Terms such as "consisting essentially of" are used to identify aspects of the invention which exclude particular components that are not explicitly recited in the claim but would otherwise have a material effect on the basic and novel properties of the concrete or mortar composition in either a dry, wet or cured form. Basic and novel properties of the present disclosure include the strength such as compressive strength, curing time, slump time, and viscosity. The term "consisting of" describes aspects of the invention in which only those features explicitly recited in the claims are included and thus other components not explicitly or inherently included in the claim are excluded.

As used herein, the term or phrase "cement" or "cement binder" refers to a composition or substance with one or more constituents that is capable of binding materials together, once set. Generally, cement can include a number of dry constituents chosen based on the desired ratio or class of cement to be produced. Thus, cement refers to the dry, pre-set composition unless the context clearly dictates otherwise. The phrase "cementitious binder material" refers to materials or mixtures of materials that are "cements" or materials that are capable of forming cement or capable of forming materials with cement-like binding properties. Therefore, included in the definition of "cementitious binder material" are those materials that have little to no cementitious value by themselves but which will, in finely divided form and in the presence of water, react chemically with certain chemicals present in the concrete or mortar composition (e.g. calcium hydroxide) at ordinary temperature to form compounds possessing cementitious properties. For example, pozzolans (e.g. fly ash, silica fume from silicon smelting, highly reactive metakaolin) and burned organic matter residues (e.g. date palm ash) fall in this category, and are therefore considered to be components of the cementitious binder material of the present disclosure. That is, pozzolans and/or some burned organic matter (e.g. date palm ash) are not considered "cements" in the present disclosure, but can be mixed with cements to form "cementitious binder materials."

A weight percent of a component, unless specifically stated to the contrary, is based on the total weight of the formulation or composition in which the component is included. For example if a particular element or component in a composition or article is said to have 8 wt %, it is understood that this percentage is in relation to a total compositional percentage of 100%/. Further, with respect to cementitious binder material, the dry weight basis is used, that is, the wt % does not include any water added to set the cementitious binder material. With respect to the total concrete or mortar composition, the content of various components may be expressed in terms kg of said component per $m^3$ of the total concrete or mortar composition, and because the concrete or mortar composition includes water, the content recited as $kg/m^3$ is in terms of a wet basis (the amount of water is included).

According to a first aspect, the present disclosure relates to a concrete or mortar composition that comprises, consists essentially of, or consists of (i) a cementitious binder material comprising Portland cement and date palm ash, (ii) a coarse aggregate, (iii) a fine aggregate, and (iv) water.

The cementitious binder material herein includes at least one cement. For example, the cement may include hydraulic cement, non-hydraulic cement, or a combination thereof. In a preferred embodiment, the cement comprises Portland cement, a basic ingredient of concrete, mortar, stucco, and non-specialty grout, which is a fine powder, produced by heating limestone and clay minerals in a kiln to form clinker, grinding the clinker, and adding small amounts of other materials. Several types of Portland cement may be employed herein, for example, Ordinary Portland Cement (OPC) type I, type II, type III, type IV, or type V, or a combination thereof (in accordance with the ASTM C150 standard). Portland Cement type Ia, type IIa, and/or type IIIa may also be used, which have the same composition as types I, II, and III except that an air-entraining agent is ground into the mix (also in accord with the ASTM C150 standard). Additional cement types include hydraulic cements, non-hydraulic cements, Portland fly ash cement, Portland Pozzolan cement, Portland silica fume cement, masonry Cements, mortars, EMC cements, stuccos, plastic cements, expansive cements, White blended cements, Pozzolan-lime cements, slag-lime cements, supersulfated cements, calcium aluminate cements, calcium sulfoaluminate cements, geopolymer cements, Rosendale cements, polymer cement mortar, lime mortar, and/or Pozzolana mortar. In one embodiment, the cement comprises a cement blend of two or more types of cement, for example, a blend comprising Portland cement and non-Portland hydraulic cement. In a further embodiment, the cement is in the dry form. If needed to set, water is typically added after the cement is mixed with the other components/ingredients, for example, the date palm ash, and the coarse and fine aggregate, and it is then ready to be hardened or set.

Any amount of cement may be incorporated into the concrete or mortar compositions herein, however typical amounts range from 200-400 $kg/m^3$, or 210-380 $kg/m^3$, or 220-360 $kg/m^3$, or 230-340 $kg/m^3$, or 240-320 $kg/m^3$, or 245-315 $kg/m^3$, or 260-310 $kg/m^3$ of the concrete or mortar composition or 10-30 wt %, 12-28 wt %, 14-26 wt %, 15-24 wt %, 16-22 wt %, 17-20 wt % based on the total weight of the concrete or mortar composition depending on the particular application (e.g. light vs. normal concrete) (wet basis).

In the most preferred embodiment, the cement is Ordinary Portland cement (OPC) Type I.

The cementitious binder material, in addition to at least one cement, also includes date palm ash. Date palm ash is a material produced from the process of recycling local palm or from burning dead palm fronds referred to locally as "Tabanh" from palm plants such as those located in the eastern province of Saudi Arabia. In these regions, local palm recycling produces two commercial products: palm-based firewood and coal. The process of manufacturing palm firewood and coal includes several stages such as 1) obtaining the raw palm plant/frond material 2) initial grinding 3) final grinding 4) drying 5) pressing to form firewood 6) converting firewood into coal through environmentally friendly oven heating and 7) cooling to provide the coal (see FIG. 1). Date palm ash (PA) (also called "palm ash") is produced as wastage during the production of these palm firewood and coal products during oven drying/heating steps for 5-10 hours, or 5-9 hours or 6-8 hours, or 7 hours from the raw materials or from the conversion of firewood into coal. This date palm ash is used herein as a partial replacement of cement (e.g. Portland cement) as the cementitious binder. The process for producing date palm ash therefore differs from methods used to make oil palm shell (OPS), which is a waste product from the palm oil extraction process using fresh fruit bunches (FFB), and palm oil fuel ash (POFA), also referred to as oil palm ash (OPA), which involves burning palm oil shell and husk (palm oil empty fruit bunch) as fuel in a palm oil mill boiler in order to produce steam to generate electricity for the palm oil extraction process instead of using conventional fuels.

The cementitious binder material of the present disclosure contains 1-50 wt %, preferably 2-45 wt %, preferably 4-40 wt %, preferably 5-35 wt %, preferably 6-30 wt %, preferably 7-25 wt %, preferably 8-20 wt %, preferably 9-18 wt %, preferably 10-15 wt % date palm ash relative to the total weight of the cementitious binder material (dry basis). In a preferred embodiment, the cementitious binder material contains 5-15 wt % of the date palm ash relative to the total weight of the cementitious binder material. This equates to an amount of date palm ash of 20-150 kg/m$^3$, or 20-150 kg/m$^3$, or 20-150 kg/m$^3$, or 20-150 kg/m$^3$, or 20-150 kg/m$^3$, or 20-150 kg/m$^3$, or 20-150 kg/m$^3$ of the concrete or mortar composition (wet basis).

The composition of date palm ash can vary depending on the source of date palms, and the conditions under which the date palms were grown, for example, the types and amount of fertilizers can affect the chemical make-up (e.g. the amount of $K_2O$). However, in a preferred embodiment, date palm ash suitable for use in the present disclosure comprises at least one of the following chemical constituents, preferably three or more of all of the following chemical constituents, most preferably all of the following chemical constituents as determined by well-accepted standard ASTM C114, each by weight relative to the total weight of the date palm ash:

30-40 wt % $SiO_2$, preferably 31-40 wt % $SiO_2$, preferably 32-40 wt % $SiO_2$, preferably 33-40 wt % $SiO_2$, preferably 34-40 wt % $SiO_2$, preferably 35-40 wt % $SiO_2$, or most preferably about 35.93 wt % $SiO_2$;

0.1-1.0 wt % of $Fe_2O_3$, preferably 0.2-0.95 wt % of $Fe_2O_3$, preferably 0.3-0.9 wt % of $Fe_2O_3$, preferably 0.4-0.85 wt % of $Fe_2O_3$, preferably 0.5-0.8 wt % of $Fe_2O_3$, or most preferably about 0.79 wt % of $Fe_2O_3$;

10-15 wt % of CaO, preferably 10.5-14.5 wt % of CaO, preferably 11-14 wt % of CaO, preferably 11.5-13.9 wt % of CaO, preferably 12-13.7 wt % of CaO, preferably 12.5-13.5 wt % of CaO, preferably 13-13.4 wt % of CaO, or most preferably about 13.3 wt % of CaO;

0.1-1.0 wt % of $Al_2O_3$, preferably 0.2-0.9 wt % of $Al_2O_3$, preferably 0.3-0.8 wt % of $Al_2O_3$, preferably 0.4-0.7 wt % of $Al_2O_3$, preferably 0.5-0.68 wt % of $Al_2O_3$, or most preferably about 0.65 wt % of $Al_2O_3$;

5-10 wt % of MgO, preferably 5.4-9 wt % of MgO, preferably 5.6-8 wt % of MgO, preferably 5.8-7.5 wt % of MgO, preferably 6.0-7.0 wt % of MgO, preferably 6.2-6.5 wt % of MgO, or most preferably about 6.36 wt % of MgO;

2-10 wt % of $K_2O$, preferably 3-9.5 wt % of $K_2O$, preferably 4-9 wt % of $K_2O$, preferably 5-8.5 wt % of $K_2O$, preferably 6-8 wt % of $K_2O$, preferably 7-7.5 wt % of $K_2O$, or most preferably about 7.4 wt % of $K_2O$; and 1-5 wt % of $Na_2O$, preferably 1.5-4.5 wt % of $Na_2O$, preferably 2-4 wt % of $Na_2O$, preferably 2.5-3.9 wt % of $Na_2O$, preferably 3-3.8 wt % of $Na_2O$, preferably 3.5-3.7 wt % of $Na_2O$, or most preferably about 3.6 wt % of $Na_2O$.

In an alternative embodiment, the date palm ash comprises at least one of the following chemical constituents, preferably three or more of all of the following chemical constituents, most preferably all of the following chemical constituents as determined by well-accepted standard ASTM C114, each by weight relative to the total weight of the date palm ash:

40-55 wt % $SiO_2$, preferably 41-54 wt % $SiO_2$, preferably 42-53 wt % $SiO_2$, preferably 44-52 wt % $SiO_2$, preferably 46-51 wt % $SiO_2$, preferably 48-50 wt % $SiO_2$, or most preferably about 48.04 wt % $SiO_2$;

1.5-3.0 wt % of $Fe_2O_3$, preferably 1.7-2.9 wt % of $Fe_2O_3$, preferably 1.9-2.8 wt % of $Fe_2O_3$, preferably 2.1-2.7 wt % of $Fe_2O_3$, preferably 2.3-2.6 wt % of $Fe_2O_3$, or most preferably about 2.51 wt % of $Fe_2O_3$;

10-15 wt % of CaO, preferably 10.5-14.9 wt % of CaO, preferably 11.5-14.8 wt % of CaO, preferably 12-14.7 wt % of CaO, preferably 12.5-14.6 wt % of CaO, preferably 13-14.5 wt % of CaO, preferably 13.5-14.4 wt % of CaO, or most preferably about 14.2 wt % of CaO;

5.5-7 wt % of $Al_2O_3$, preferably 5.6-6.8 wt % of $Al_2O_3$, preferably 5.7-6.6 wt % of $Al_2O_3$, preferably 5.8-6.4 wt % of $Al_2O_3$, preferably 5.9-6.2 wt % of $Al_2O_3$, or most preferably about 6.12 wt % of $Al_2O_3$;

4-6 wt % of MgO, preferably 4.2-5.8 wt % of MgO, preferably 4.3-5.6 wt % of MgO, preferably 4.4-5.4 wt % of MgO, preferably 4.5-5.2 wt % of MgO, preferably 4.6-5.0 wt % of MgO, or most preferably about 4.88 wt % of MgO;

1-4 wt % of $K_2O$, preferably 1.5-3.6 wt % of $K_2O$, preferably 2-3.2 wt % of $K_2O$, preferably 2.2-3.1 wt % of $K_2O$, preferably 2.4-3.0 wt % of $K_2O$, preferably 2.6-2.9 wt % of $K_2O$, or most preferably about 2.8 wt % of $K_2O$; and 0.5-3 wt % of $Na_2O$, preferably 1-2.8 wt % of $Na_2O$, preferably 1.2-2.6 wt % of $Na_2O$, preferably 1.4-2.4 wt % of $Na_2O$, preferably 1.6-2.2 wt % of $Na_2O$, preferably 1.7-2.0 wt % of $Na_2O$, or most preferably about 1.81 wt % of $Na_2O$.

The loss on ignition (LOI) of the date palm ash used herein is less than 10%, preferably less than 9%, preferably less than 8% by weight based on a total weight of the date palm ash, and thus is generally considered acceptable for use in the cementitious binder material.

The date palm ash employed in the present concrete and mortar composition therefore differs considerably from other products produced from palm-based plants, such as palm oil products, palm oil fuel ash (POFA) and oil palm shell (OPS), as well as other conventional pozzolanic materials such as fly ash, in terms of type and amounts of chemical constituents [Michael Yong Jing Liu, Choon Peng Chua, U. Johnson Alengaram, and Mohd Zamin Jumaat, "Utilization of Palm Oil Fuel Ash as Binder in Lightweight Oil Palm Shell Geopolymer Concrete," Advances in Materials Science and Engineering, vol. 2014, Article ID 610274, 6 pages, 2014; H. Awang and M. Z. Al-Mulali "Strength of Sieved Only Oil Palm Ash Foamed Concrete" International Journal of Engineering and Technology, Vol. 8, No. 5, 2016;

Mohammed Zuhear Al-mulali, Hanizam Awang, H. P. S. Abdul Khalil, Zaid Shaker Aljoumaily "The incorporation of oil palm ash in concrete as a means of recycling: A review" Cement & Concrete Composites 55 (2015) 129-138; and Md. Rezaul Karim; M. F. M. Zain; M. Jamil; Md. Nazrul Islam "Strength of Concrete as Influenced by Palm Oil Fuel Ash" Australian Journal of Basic and Applied Sciences, 5(5): 990-997, 2011—each incorporated herein by reference in its entirety], in particular, the amounts of each of $SiO_2$, CaO, $Fe_2O_3$, MgO, and $Al_2O_3$.

In one embodiment, the date palm ash has a specific gravity (the ratio of density of date palm ash to the density of water at 1 atm and 4° C.) of 2.0-2.5, preferably 2.1-2.49, preferably 2.2-2.48, preferably 2.3-2.47, most preferably 2.4-2.46.

Further, the date palm ash used in the concrete and mortar compositions described herein pass through a 425 µm sieve, preferably through a 400 µm sieve, preferably through a 350 µm sieve, preferably through a 300 µm sieve, preferably through a 200 µm sieve, preferably through a 150 µm sieve, and therefore have a maximum particle size of less than 425 µm, less than 400 µm, less than 350 µm, less than 300 µm, less than 200 µm, preferably less than 150 µm, or most preferably less than about 149 µm.

After forming the date palm ash or obtaining the date palm ash from the process outlined earlier, the date palm ash may be chemically modified to change its properties or 'activate' its binding properties. For example the date palm ash may be treated with a hydroxide base such as sodium or potassium hydroxide, treated with a mineral acid such as HCl, sulfuric acid, and/or nitric acid, treated with an organic acid such as citric acid, formic acid, acetic acid oxalic acid, and the like, or oxidized with a strong oxidant such as a peroxide, ozone, and corona discharge applications.

In addition to the cement and the date palm ash, other pozzolanic materials may optionally be included in the cementitious binder material, including limestone, fly ash (e.g. siliceous fly ash or calcareous fly ash), ground blast furnace slag (GGBFS or GGBS), silica fume, metakaolin, carbon nanofibers and carbon products. Such additional pozzolanic materials may optionally be added as a partial replacement of the cement component up to about 50 wt %, up to 40 wt %, up to 30 wt %, up to 20 wt %, up to 10 wt %, up to 5 wt %, up to 1 wt %, relative to the total weight of the cement (e.g. Portland cement).

When the cement (e.g. Portland cement) and the date palm ash are mixed together, along with any other optional ingredients to form the cementitious binder material, said cementitious binder material is present at 200-500 kg per $m^3$ of the concrete or mortar composition, preferably 200-500 kg per $m^3$, preferably 225-475 kg per $m^3$, preferably 250-450 kg per $m^3$, preferably 275-425 kg per $m^3$, preferably 300-400 kg per $m^3$, preferably 325-375 kg per $m^3$, or most preferably about 350 kg per $m^3$ of the concrete or mortar composition.

In one embodiment, the cementitious binder material consists of cement (e.g. Ordinary Portland cement type I) and the date palm ash. In one embodiment, the cementitious binder material, and therefore the concrete or mortar compositions, are free of other products produced from date palm plants including palm oil fuel ash (POFA) and oil palm shell (OPS).

The use of date palm ash as a partial replacement of cement (i.e. Portland cement) in accordance with the methods and compositions of the present disclosure not only provides concrete and mortar compositions and cured concrete and mortar products (cured product forms) with advantageous properties as discussed later, but the use of date palm ash also reduces the high $CO_2$ emissions generated during manufacture of cement and enables recycling of byproduct with otherwise limited utility (date palm ash).

The concrete or mortar composition of the present disclosure includes a coarse aggregate. Coarse aggregates are used to influence the concrete's freshly mixed and hardened properties, mixture proportions, and economy of producing. The types and amounts of coarse aggregate can be varied depending on the application. For example, the type and amount of coarse aggregate can be varied to produce a lightweight concrete with a bulk density commonly less than about 1450 kg/$m^3$, a normal weight concrete with a bulk density of about 1500-2400 kg/$m^3$ (ASTM C33), or a heavyweight concrete with a bulk density of greater than 2400 kg/$m^3$ (ASTM C637 and C638). Typically, the coarse aggregate has particle size of 3-25 mm, preferably 5-24 mm, preferably 7-23 mm, preferably 10-22 mm, preferably 13-21 mm, preferably 16-20 mm, preferably about 17-19 mm, although coarse aggregates with particle sizes slightly above or below these values (+/−2 mm) may also function as intended. The grading of coarse aggregate employed herein preferably conforms to the standard ASTM C 33 with a Size No 56.

Exemplary coarse aggregates include crushed recycled concrete, gravel, rocks, natural soil, quarried crushed mineral aggregates from igneous (granite, syenite, diorite, gabbro peridotite pegmatite, volcanic glass, felsite, basalt), metamorphic (marble, metaquartzite, slate, phyllite, schist, amphibolite, hornfels, gneiss, serpentine) or sedimentary rocks (conglomerate, sandstone, claystone, siltstone, argillite, shale, limestone, dolomite, marl, chalk, chert), including unused and waste aggregates from quarry operations, dredged aggregates, china clay stent, china clay wastes, natural stone, recycled bituminous pavements, recycled concrete pavements, reclaimed road base and subbase materials, crushed bricks, construction and demolition wastes, waste/recycled flue gas ashes, crushed glass, slate waste, waste plastics, egg shells, sea shells, barite, limonite, magnetite, ilmenite, hematite, iron, steel, including recycled or scrap steel, and mixtures thereof. In one embodiment, the coarse aggregate is limestone, preferably crushed limestone. The crushed limestone can be made by crushing, grinding, pulverizing, etc. any natural limestone or recycled limestone. The amounts of coarse aggregate deployed herein may vary, but typical values range between 600-1,500 kg per $m^3$ of the concrete or mortar composition, preferably 610-1,400 kg per $m^3$, preferably 620-1,300 kg per $m^3$, preferably 630-1,200 kg per $m^3$, preferably 640-1,100 kg per $m^3$, preferably 650-1,100 kg per $m^3$, preferably 660-1,110 kg per $m^3$ of the concrete or mortar composition, or 35-80 wt %, preferably 36-75 wt %, preferably 37-70 wt %, preferably 38-65 wt %, preferably 39-60 wt %, preferably 40-50 wt %, or most preferably 41-46 wt %, relative to the total weight of the concrete and mortar composition.

The concrete and mortar compositions of the present disclosure include a fine aggregate. The fine aggregates herein may be sand, blast furnace granulated slag, and/or crushed/pulverized stone or rock made from materials described for use as the coarse aggregate. In the event a coarse aggregate and a fine aggregate are used in the concrete or mortar composition that is sourced from the same material, for example, crushed limestone, then the particle size will dictate whether it is defined as coarse or fine aggregate. In a preferred embodiment, the course and the fine aggregates employed are different materials, for example, the course aggregate is crushed limestone, and the fine aggregate is sand.

In one embodiment, the fine aggregate has a particle size of less than 0.5 mm, preferably less than 0.48 mm, preferably less than 0.46 mm, preferably less than 0.44 mm, preferably less than 0.42 mm, preferably less than 0.40 mm. In some embodiments, the fine aggregate may be passed through sieve No. 100 to provide fine aggregates with a particle size of no more than 149 μm, no more than 130 μm, no more than 120 μm, or no more than 100 μm. In one embodiment, and the fine aggregate is dune sand.

The amounts of fine aggregate deployed herein may vary, but typical values range between 400-700 kg per m$^3$ of the concrete or mortar composition, preferably 410-695 kg per m$^3$, preferably 420-690 kg per m$^3$, preferably 430-685 kg per m$^3$, preferably 440-680 kg per m$^3$, preferably 450-675 kg per m$^3$, preferably 460-673 kg per m$^3$, preferably 448-672 kg per m$^3$ of the concrete or mortar composition, or 20-40 wt %, preferably 22-38 wt %, preferably 24-36 wt %, preferably 26-34 wt %, preferably 27-32 wt %, or most preferably 28-31 wt %, relative to the total weight of the concrete and mortar composition.

In one embodiment, a weight ratio of the fine aggregate to the coarse aggregate is in a range of 0.5-0.8, preferably 0.55-0.76, preferably 0.6-0.72, preferably 0.65-0.7, or most preferably about 0.667.

The concrete and mortar composition also includes water. In one embodiment, the weight ratio of the water to the cementitious binder material (w/cm) is 0.2-0.6, preferably 0.25-0.55, preferably 0.3-0.5, preferably 0.35-0.45, preferably about 0.4. However, a person of ordinary skill can adjust the water content of the concrete or mortar compositions as needed to suit the application or workability requirements, and the w/cm weight ratio may therefore fall outside of these described ranges. Suitable water sources include fresh water, potable water, seawater, and the like.

In some embodiments, the disclosed concrete or mortar compositions optionally comprise at least one additional ingredient, such as an accelerator, a retarder, a plasticizer, a superplasticizer, a pigment, a corrosion inhibitor, and a bonding agent, including mixtures thereof. The additional ingredient(s), when present, may be present in an amount up to 10 wt %, preferably up to 8 wt %, preferably up to 6 wt %, preferably up to 4 wt %, preferably up to 2 wt %, preferably up to 1 wt %, preferably up to 0.5 wt % based on the total weight of the cementitious binder material. For example, if 100 kg of cementitious binder material is present, for 3.5 wt % of the additional ingredient(s), 3.5 kg of the additional ingredient(s) is present regardless of the other components. In still a further embodiment, the disclosed concrete or mortar compositions further comprise a reinforcing component, such as, for example, steel reinforcement bars, steel mesh, steel fibers, glass fibers, carbon fibers, or plastic fibers, and the like.

As used herein, the term or phrase "accelerator," "cement accelerator," or "concrete accelerator" refers to a chemical capable of accelerating the hardening (early strength development) of cement or concrete. For example, a "non-chloride cement accelerator" refers to a chloride-free chemical capable of accelerating the early strength development of cement or concrete. The disclosed concrete or mortar compositions may optionally comprise a cement accelerator selected from calcium nitrite, calcium nitrate, calcium formate, calcium chloride, or sodium nitrate, or a combination thereof. In a preferred embodiment, the cement accelerator comprises calcium chloride, calcium nitrate, or sodium nitrate, or a combination thereof. In some embodiments, the cement accelerator comprises a non-chloride cement accelerator, which includes calcium nitrite, or calcium formate, or a combination thereof.

The retarder may be selected from a borate salt such as of sodium pentaborate ($Na_2B_{10}O_{16}$), sodium tetraborate ($Na_2B_4O_7$) and boric acid ($H_3BO_3$); an organophosphonate including sodium or calcium salts of ethylenediaminetetra (methylenephosphonic acid) (EDTMP), hexamethylenediaminetetra (methylenephosphonic acid), and diethylenetriaminepenta (methylenephosphonic acid); copolymers formed from 2-acrylamido-2-methylpropane-3-sulphonic acid (AMPS) and a monomer selected from the group consisting of acrylic acid, acrylamide; metal sulfates such as ferrous sulfate; gypsum; sugar; sucrose; sodium gluconate; glucose; citric acid; tartaric acid; and the like.

Broadly, a plasticizer is a material that when added to another yields a mixture which is easier to handle or has greater utility. The plasticizer as used herein means an organic compound which is usually non-volatile at standard room temperature and pressure (25° C., 1 atm.) and which has no specific chemical reactivity. As such, the plasticizer is inert towards the cementitious binder material and merely serves as a medium in which that cementitious binder material may be suspended or otherwise dispersed. Suitable plasticizers may be selected from polyalkyleneglycols and other polyethers, sulfonated or phosphorylated organic compounds, alkyl or aryl esters of organic acids, oils from natural or synthetic nature, a variety of vinyl polymers, and polyesters or silicones. Suitable polyalkyleneglycols include polyethylene glycol, blends with polypropylene glycol or other co-plasticizers to make it liquid, polypropylene glycol and other liquid polyethers in general, e.g. copolymers of ethylene oxide, propylene oxide and/or butylene oxide. Suitable sulfonated or phosphorylated organic compounds include alkyl sulfonic acid ester of phenol and cresol (for example available as Mesamoll) and aromatic sulfonamides. Suitable alkyl or aryl esters of organic acids include benzoic acid esters of glycols and their oligomers (for example available as Bensoflex), esters of 1,2 dicarboxy cyclohexane (hydrogenated phthalates, Hexamoll DINCH), phthalic acid esters, terephthalic acid esters, trimellitates, adipic acid esters, sebasic acid esters, tartrate esters, citric acid esters and sucrose esters. Suitable oils from natural or synthetic nature include vegetable oils and their derivatives including fatty acid esters and epoxidised vegetable oils, organic liquids derived from wood and other forest products like liquid rosin esters and hydrocarbon fluids such as mineral oil or paraffinic liquids. Suitable vinyl polymers include polyisobutene, liquid polybutadiene and liquid polyacrylates. Liquid polyesters and silicone fluids are also suitable and available to the skilled person. The above mentioned plasticizers can be used in combination.

The superplasticizers that may be employed in accordance with the present disclosure include polyalkylaryl sulfonate superplasticizers, melamine/formalin resin sulfonate superplasticizers, sulfonated copolymer superplasticizers, and polymers obtained by the copolymerization of (meth)acrylic acids, maleic anhydride, maleic acids or their salts with polyoxyethylene (meth)acrylic esters or adducts of polyethylene derivatives to vinyl monomers (commonly known as "acrylic superplasticizers", "vinyl superplasticizers" and "polycarboxylates superplasticizers" according to the type of monomers used for their production). However, any plasticizers not composed of the above components but exhibiting strong tackiness and non-bleeding properties may be employed as the superplasticizer of the present disclosure. The polyalkylaryl sulfonate type superplasticizer includes a condensation product of naphthalene sulfonic acid with formalin or a salt thereof, a condensation product of methylnaphthalene sulfonic acid with formalin or a salt thereof, and a condensation product of anthracene sulfonic acid with formalin or a salt thereof. The polyalkylaryl sulfonate type superplasticizers are marketed under the trade names of "MIGHTY 100", "MIGHTY 150" and "MIGHTY 200" by KAO Corporation; "SELFLOW-110P" by Dai-ichi Kogyo Seiyaku Co., Ltd.; "POLFINE 510N" by Takemoto Oil and Fat Co. Ltd.; "SANFLO-PS" and "SANFLO-PSR" by Sanyo-Kokusaku Pulp Co. Ltd.; and "FT-500" by Denki Kagaku Kogyo KK. The melamine/formalin resin sulfonate type superplasticizers are marketed under the trade names of "MELMENT F-10" and "MELMENT F-20" by Showa Denko KK. and "NL-4000" by Nisso Master Builders Co., Ltd. Exemplary sulfonated copolymers include styrene-α-methylstyrene copolymers containing a mole ratio of from 90:10 to 10:90, preferably 30:70 to 70:30, of styrene to α-methylstyrene. Polycarboxylate polymers are preferably obtained by polymerization of acrylic acid and methacrylic acid or their mixtures, optionally in combination with other monomers capable to react with acrylic and methacrylic acid. Typical examples of such monomers are maleic anhydride, maleic acid, styrene, vinyl sulfonic acid, 2-acrylamido-2-methyl-1-propanesulfonic acid (AMPS) and vinyl acetate Pigments may optionally be included in the concrete or mortar composition to form colored cured concrete or mortar products. Exemplary pigments include, but are not limited to iron oxide, natural burnt umber, carbon black, chromium oxide, ultra-marine blue and titanium dioxide and are commercially available from Harcross Pigments, Inc., Bayer Corporation, Reckitts Colour Ltd. and DuPont Corp.

Other optional additional ingredients in the concrete or mortar compositions disclosed herein include corrosion inhibitors such as nitrites (e.g. calcium nitrite, see JP, B, H2-28532), chromates, phosphate, benzotriazoles or alkanolamines (e.g. N,N-diethyl-ethanolamine, N-methyl-ethanolamine, monoethanloamine, diethanloamine, triethanloamine and the like, see JP, A, H7-173650) and bonding agents which comprises a blend of aluminum sulfate and an alkali metal silicate comprising, for example, sodium and/or potassium silicate.

In one embodiment, the cementitious binder material (e.g. cement and date palm ash), the coarse aggregate, and the fine aggregate are placed in a concrete mixer/mixing vessel and dry mixed in a mechanical mixer or by hand for any time period suitable for forming a workable mixture wherein all components are uniformly dispersed/distributed, typically this time period is around 30 seconds-10 minutes, 45 seconds-8 minutes, or 50 seconds-5 minutes. The cementitious binder material may be pre-formed and/or pre-packaged prior to mixing with the other components (e.g. the coarse/fine aggregates), or alternatively the cement, date palm ash, and any other optional pozzolanic material may be added as separate components to the mixer/mixing vessel to form the cementitious binder material in situ. Following the dry mixing process, water is added, preferably by slow addition into the mixer while turning the resulting concrete and mortar composition for a time period generally in the range of 1-10 minutes, 2-8 minutes, or 3-6 minutes, although time periods outside of these ranges may also be acceptable. The relative amounts of the components may be adjusted to achieve concrete or mortar compositions having the desired properties, for example the slump may be tested and adjusted to be within desired specifications by adjusting the relative amounts of the cementitious binder material (e.g. the cement and/or the date palm ash), the coarse/fine aggregates, the water, and/or any optional additional ingredients. Any desired additional ingredient(s) (e.g. the accelerator, the retarder, the plasticizer, the superplasticizer, the pigment, the corrosion inhibitor, and the bonding agent) may be added during the dry mixing step or after the addition of water. Preferably, all desired components are weighed in suitable amounts and mixed in a mechanical electronic mixer according to ASTM C192 and ASTM C305.

Slump is term of art relating to a standard test for determining the ease of movement of an unset cement composition. The slump test measures the amount of settlement of flow a shaped cement charge has once under unsupported conditions. A cement composition is workable, i.e. moldable, shapable, etc. while the cement exhibits some degree of slump or flow characteristics. Advantageous concrete or mortar compositions described herein typically will have a slump of 30-105 mm as determined by the ASTM C143 standard.

After forming the desired concrete or mortar composition, said composition may be molded, casted, placed, compacted, finished, and/or cured (set) as needed to suit the application. For example, the concrete or mortar composition may be fed into a mold to create any desired shape, for example in the shape of a masonry block for application in construction materials. The concrete or mortar composition may be cast in a mold to produce a cast or precast composition or product. In various embodiments, the casting process comprises any typical cement or concrete casting process. In one embodiment, the casting process is carried out in multiple steps, for example a vibration step may be utilized by vibrating the filled mold, for example, to remove air and/or minimize segregation. In one embodiment, a top surface of the filled mold is removed and fresh mixture is added to fill the mold. In another embodiment, the vibration and filling steps are repeated as necessary to produce the desired composition or product. The molding, casting, curing steps may be carried out in a controlled environment to form a precast, or performed on site in standard concrete processes. In one embodiment, the concrete or mortar composition is cured by submerging the specimens into a water tank per the provisions of ASTM C511. The cure times may vary from 1 day to 400 days, for example, 3, 7, 14, 28, 90, 180, and 360 days and any time in between those stated values, preferably 28-360 days.

The concrete and mortar composition herein provides cured products having advantageous compressive strength, water absorption, chloride permeability, water loss, creep, leaching, and thermal properties. Moreover, such advantageous properties are obtainable at a lower cost than standard concretes due at least partially to the inclusion of date palm ash as described.

The present concrete and mortar composition provides, after curing/setting, a high early compressive strength, with a 1-5 day compressive strength ranging from 20-55 MPa, preferably 22-50 MPa, preferably 24-47 MPa, preferably 26-46 MPa, preferably 28-45 MPa. In a preferred embodiment, the cementitious binder material contains 5-15 wt %, 7-12 wt %, or about 10 wt % of the date palm ash relative to the total weight of the cementitious binder material, and has a 3 day compressive strength of 35-50 MPa, 40-48 MPa, 42-46 MPa, 35-45 MPa, 43-44 MPa after setting. This compressive strength is superior to that obtained from a material having no date palm ash (cement only cementitious binder material) at 26.6 MPa.

The present concrete and mortar composition also provides, after curing/setting, a 10-40 day compressive strength ranging from 40-65 MPa, preferably 45-64 MPa, preferably 50-63 MPa, preferably 55-62 MPa, preferably 56-61 MPa. In a preferred embodiment, the cementitious binder material contains 5-15 wt %, 7-12 wt %, or about 10 wt % of the date palm ash relative to the total weight of the cementitious binder material, and has a 28 day compressive strength of 56-60 MPa, 56.2-59 MPa, 56.4-58 MPa, 56.6-57 MPa after setting.

The present concrete and mortar composition also provides, after curing/setting, a 300 or more day compressive strength ranging from 50-100 MPa, preferably 60-95 MPa, preferably 65-90 MPa, preferably 70-88 MPa, preferably 75-86 MPa. In a preferred embodiment, the cementitious binder material contains 5-15 wt %, 7-12 wt %, or about 10 wt % of the date palm ash relative to the total weight of the cementitious binder material, and has a 360 day compressive strength of 83-90 MPa, 84-89 MPa, 85-88 MPa, 85.5-87 MPa after setting.

All compressive strength tests may be tested using cubed mortar samples via a compression testing machine per ASTM C109.

Water absorption is a measure of concrete permeability. A low water absorption rate equates to reduced permeability of deleterious substances into concrete and therefore a longer life span, particularly when applied to aquatic settings. Calculations for determining both the initial rate of water absorption and the secondary rate of water absorption as well as the testing procedure used are described in ASTM C1585.

The present concrete and mortar composition provides, after curing/setting, a low rate of initial water absorption and a low rate of secondary water absorption, with a maximum initial water absorption rate of 0.4-1.0 mm/s, 0.42-0.9 mm/s, 0.44-0.8 mm/s, 0.46-0.7 mm/s, 0.48-0.6 mm/s, and a maximum secondary water absorption rate of 1.5-3.0 mm/s, 1.6-2.5 mm/s, 1.7-2.0 mm/s, 1.8-1.95 mm/s, 1.9-1.94 mm/s.

In a preferred embodiment, the cementitious binder material contains 5-15 wt %, 7-12 wt %, or about 10 wt % of the date palm ash relative to the total weight of the cementitious binder material, and has a maximum initial rate of water absorption of 0.25-0.72 mm/s, 0.30-0.70 mm/s, 0.35-0.65 mm/s, 0.4-0.6 mm/s, 0.45-0.58 mm/s, 0.5-0.56 mm/s after setting. Such an initial water permeability rate is about 30-40% lower than that obtained from a material having no date palm ash (cement only cementitious binder material).

In a preferred embodiment, the cementitious binder material contains 5-15 wt %, 7-12 wt %, or about 10 wt % of the date palm ash relative to the total weight of the cementitious binder material, and has a maximum secondary rate of water absorption of 1.75-2.25 mm/s, 1.8-2.1 mm/s, 1.85-2.0 mm/s, 1.9-1.98 mm/s, 1.92-1.95 mm/s after setting. Such a secondary water permeability rate is about 15-25% lower than that obtained from a material having no date palm ash (cement only cementitious binder material).

Like water absorption, the permeability to chloride and other aggressive agents (i.e. $Cl^-$, $SO_4^{2-}$ or $CO_2$) can be measured through charges passed into concrete samples. Advantageous concrete or mortar materials therefore have low chloride permeability (coulombs passed), and thus advantageous durability, particularly when applied to aquatic settings as determined by a rapid chloride permeability test (RCPT) according to the standard ASTM C1202.

The present concrete and mortar composition provides, after curing/setting, a resistance to the permeability of chloride anions with an average charges passed (coulombs) through the concrete of 3,000-8,500, 3,100-6,000, 3,200-4,000, 3,250-3,500.

In a preferred embodiment, the cementitious binder material contains 5-15 wt %, 7-12 wt %, or about 10 wt % of the date palm ash relative to the total weight of the cementitious binder material, and has an average chloride permeability of 2,000-3,500, 2,200-3,400, 2,400-3,300, 2,600-3,200, 2,800-3,260, 3,000-3,250 coulombs after setting.

According to a second aspect, the present disclosure relates to a cured concrete or mortar product containing the composition disclosed herein, in one or more of its embodiments, in cured form.

In one embodiment, the cementitious binder material contains 5-15 wt % of the date palm ash relative to the total weight of the cementitious binder material, and has at least one of (a) a 3 day compressive strength of 35-50 MPa, (b) a 28 day compressive strength of 56-60 MPa, and (c) a 360 day compressive strength of 83-90 MPa.

In one embodiment, the cementitious binder material contains 5-15 wt % of the date palm ash relative to the total weight of the cementitious binder material, and has at least one of (a) a maximum initial rate of water absorption of 0.25-0.72 mm/s, (b) a maximum secondary rate of water absorption of 1.75-2.25 mm/s, and (c) an average chloride permeability of 2,000-3,500 coulombs.

The disclosed concrete or mortar compositions are useful in the manufacture of various end use articles or products. In one embodiment, various cured concrete or mortar products are formed from setting/curing the disclosed concrete or mortar compositions. In a further embodiment, the disclosed cured concrete or mortar products are in the form of a useful shape, formed by a variety of means such as, for example, using molds, casts, or forms, or the like, in accord with their intended use. Any typical process of forming cement or concrete can be used herein. Therefore, the cured concrete or mortar product may refer to a molded article. Exemplary cured concrete or mortar products of the present disclosure include, but are not limited to, slabs, panels, precast panels, wall boards, hollow blocks, floor and roof tiles, beams, columns, posts, conduits and pipes, gravestones, insulators, external cladding, slate, concrete decking, e.g. swimming pools, surfaces and surrounds, ceramic style products, marble like products, sink tops, bar tops, bathroom tops, table tops, fireplace tiles, fire proof walls, building blocks (e.g. masonry blocks); both reinforced and not reinforced by steel, depending on the use and purpose for which the manufactured products are fabricated.

As described herein, the disclosed compositions can, in various embodiments, advantageously exhibit early compressive strength development. Thus, in one embodiment, the disclosed concrete and mortar compositions are useful in cast-in-place or poured-in-place applications, where sufficient early compressive strength can be important. In a further embodiment, the disclosed cured concrete or mortar compositions are useful in precast applications such as, for example, precast structural products.

The disclosed cured concrete or mortar product may provide economic advantages. In one embodiment, the cured concrete or mortar products are useful in thin part applications such as, roof slabs or road slabs, and high temperature or sunny environments that can accelerate excessive bleeding (i.e. loss of water and cement binder slowly over time). As described above, articles and products formed from the disclosed concrete or mortar compositions exhibit improved wearing quality. As such, articles and products formed from the disclosed compositions can require less frequent replacement or repair. In a further embodiment, the improved surface quality of articles and products formed from the disclosed compositions generate less surface dust in hot environments and less mud in rainy environments.

Having generally described this disclosure, a further understanding can be obtained by reference to certain specific examples which are provided herein for purposes of illustration only and are not intended to be limiting unless otherwise specified. The examples below are intended to further illustrate protocols for preparing and characterizing the concrete and mortar compositions. They are not intended to limit the scope of the claims.

Example 1

General Materials and Methods

Figure 1:
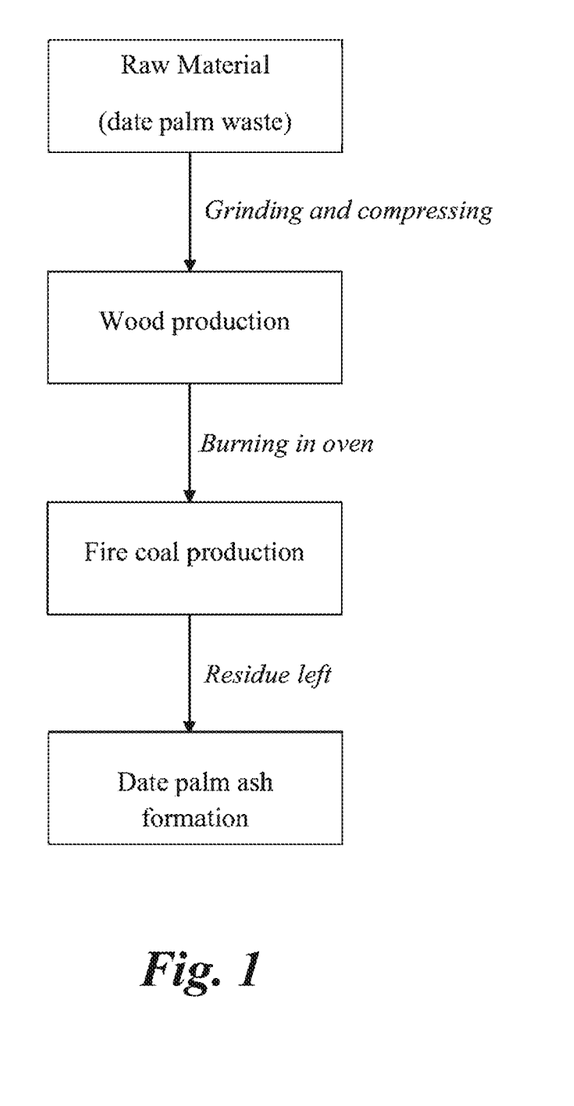
FIG. 1 is a flow diagram showing the stages of production of date palm ash (PA), wood and coal from the raw material.

Cement is a mixture of various chemical compounds. All ingredients have their own specific roles to play and impart different properties to concrete. Ordinary Portland cement (OPC) conforming to ASTM C 150 Type I was used in all of the concrete and mortar mixtures. Date palm ash is a material produced from the process of recycling local palm or from burning local palm dead fronds so-called locally Tabanh which is obtained from a recycling palm plant located in the eastern province of Saudi Arabia. The local palm recycling produces two products daily: (1) 1.5 tons of coal and (2) 3 tons of firewood while palm ash is produced from wastage during the production of these products by a process of heating the raw material in an oven for 7 hours. The local palm firewood is first produced which is turned into local palm coal and after burning the wastage the local palm ash is obtained. The process of manufacturing local palm firewood and coal consists of seven stages including initial and final grinding, drying, pressing, converting to coal through environmental friendly oven and cooling. Palm ash passing 425 μm sieve is used. 10%, 20%, and 30% of palm ash (PA) was incorporated as replacement of OPC. FIG. 1 shows the pictorial palm ash process of producing ash, coal and firewood from the raw materials till final product at plant.

Figure 2:
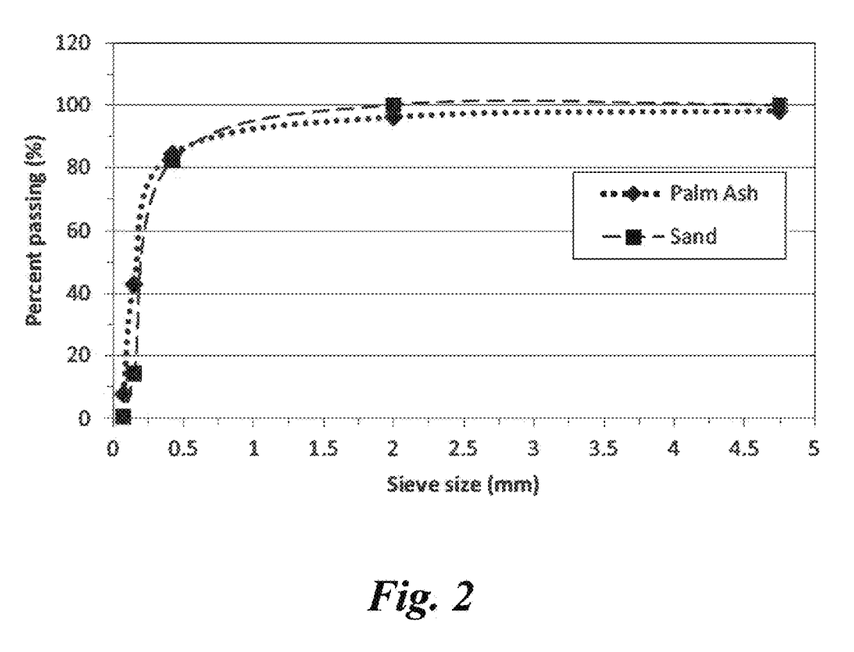
FIG. 2 is a graph illustrating the sieve analysis of date palm ash and sand.

The coarse and fine aggregates used were crushed limestone and dune sand, respectively from local quarries. The grading of coarse aggregates was conforming to ASTM C 33 (Size No. 56). Sieve analysis of both PA and sand was carried out with sieve size No. 4, 10, 40, 100 and 200. FIG. 2 shows the percentage passing of both materials. Further, the fine to coarse aggregate ratio of 0.667 by mass and the cementitious materials content of 350 kg/m³ were kept constant in all the concrete mixtures. Moreover, all the concrete and mortar specimens were prepared with a w/cm ratio of 0.4 and potable water was used for mixing and curing the specimens. Table 1 shows the physical properties of OPC, PA, sand and aggregate.

TABLE 1

Physical properties of mix constituents

| Property | OPC | PA | Sand | Aggregate |
|---|---|---|---|---|
| Moisture content (%) | 0 | 0 | 0 | 0 |
| Specific gravity | 3.44 | 2.43 | 2.82 | 2.6 |
| Water absorption (%) | — | — | 0.7 | 1.1 |
| Maximum particle size (mm) | 0.075 | 0.150 | 0.425 | 19 |

Example 2

Specimen Preparation and Curing

Four concrete and four mortar mixtures were prepared in the laboratory employing neat ordinary Portland cement (OPC) and three percentage replacement levels (10%, 20% and 30%) of date palm ash (PA) to OPC. The concrete and mortar constituents were weighted in the required proportions and mixed in an electronic mixer in accordance with ASTM C 192 and ASTM C 305. The concrete slump was measured in accordance with the provisions of ASTM C 143 and superplasticizer was used to ensure a constant slump.

After the casting, placing, compacting and finishing operations were performed, all specimens were covered with a plastic sheet until demolding. Thereafter, specimens were cured by submerging them into a water tank as per the provisions of ASTM C 511. Once the desired period was completed, the specimens were removed from the curing tank and prepared for further analysis in the test program. The effect of date palm ash dosage on mortar and concrete specimens was assessed by measuring mechanical and durability properties including, but not limited to, compressive strength, rate of water absorption, rapid chloride permeability and thermogravimetric analysis (TGA).

Example 3

Chemical Composition Analysis

In order to determine the mineralogical content of date palm ash (PA), a chemical composition analysis for PA was performed for determination of silica, Ca, K, Mg, Na, Al, and Fe. Loss on ignition was done at 950° C. as per a standard method. Table 2 shows the results chemical analysis results for date palm ash (PA) and Type I ordinary Portland cement used in the mortar and concrete specimens. It was observed that the content of $SiO_2$ of date palm ash produced in this study was around 36%. The second major portion was found to be calcite material showing about 13% in amount which is followed by sodium oxide at 8.47%. Alkaline substances, such as, for example $K_2O$ were the main foreign particles in date palm ash (PA) having a content of 7.40%. According to Zain et al. (2011), $K_2O$ content depends on types and amount of fertilizers used during growing period of the plant [Zain, M. F. M., Islam, M. N., Mahmud, F., Jamil, M., 2011. Production of rice husk ash for use in concrete as a supplementary cementitious material. Constr. Build. Mater. 25, 798-805]. Content of foreign particles like $Fe_2O_3$ and $Al_2O_3$ was less than 1%. Loss on ignition (LOI) of PA obtained using combustion was 8.41%. Thus fire duration, air supply duration and chilling process followed were reasonably appropriate.

TABLE 2

Chemical composition of date palm ash (PA) and ordinary Portland cement Type 1 (OPC)

| Parameter | PA% | OPC% |
|---|---|---|
| $SiO_2$ - ASTM C114 | 35.93 | 20 |
| $Fe_2O_3$ | 0.78 | 3 |
| CaO | 13.04 | 63 |
| $Al_2O_3$ | 0.65 | 6 |
| MgO | 6.36 | 1.5 |
| $K_2O$ | 7.40 | 0.5 |
| $Na_2O$ | 3.60 | 0.5 |
| $Na_2O + (0.658\ K_2O)$ | 8.47 | 1 |
| Loss on Ignition - Total (LOI) | 8.41 | 0.73 |

Table 3 shows the differences in chemical constitution between different sources of date palm ash (PA) and different types of POFA.

TABLE 3

Comparison of chemical composition of PA and POFA.

| PARAMETER | [1] PA | [2] PA | [3] T-POFA | [4] POFA | [5] POFA-FB | [5] POFA-K | [6] G-POFA | [6] U-POFA |
|---|---|---|---|---|---|---|---|---|
| $SiO_2$ | 35.93 | 48.04 | 66.44 | 47.37 | 63.72 | 64.07 | 51.18 | 65.01 |
| $Fe_2O_3$ | 0.78 | 2.51 | 5.72 | 6.19 | 1.39 | 2.08 | 3.42 | 4.41 |
| CaO | 13.04 | 14.21 | 5.56 | 11.83 | 7.16 | 6.36 | 6.93 | 8.19 |
| $Al_2O_3$ | 0.65 | 6.12 | 6.44 | 3.53 | 2.47 | 2.78 | 4.61 | 5.72 |
| MgO | 6.36 | 4.88 | 3.13 | 4.19 | 3.19 | 3.34 | 4.02 | 4.58 |
| $K_2O$ | 7.4 | 2.8 | 5.2 | — | 6.2 | 5.73 | 5.52 | 6.48 |
| $Na_2O$ | 3.6 | 1.81 | 0.19 | — | 0.69 | 0.87 | 0.06 | 0.07 |
| $Na_2O + (0.658\ K_2O)$ | 8.47 | — | — | — | — | — | — | — |
| Loss on Ignition | 8.41 | — | 2.3 | 1.84 | 12.56 | 1.85 | 21.6 | 2.53 |
| $SO_3$ | — | — | 0.33 | 3.31 | 0.77 | 0.52 | 0.36 | 0.33 |
| $P_2O_5$ | — | 0.45 | — | 1.22 | — | — | 4.1 | 4.69 |
| $TiO_2$ | — | 0.42 | — | — | — | — | 0.19 | 0.25 |
| MnO | — | 0.05 | — | — | — | — | 0.09 | 0.11 |
| C | — | — | — | — | — | — | 19.05 | 0.09 |
| $SiO_2 + Al_2O_3 + Fe_2O_3$ | — | — | — | — | — | — | 59.21 | 75.14 |

NOTATIONS:
PA = date palm ash
POFA-FB = POFA from fruit bunches
POFA-K = POFA from kernels
G-POFA = ground POFA
U-POFA = ultrafine POFA References:
[1] W. Al-kutti, A. B. M. S. Islam, and M. Nasir, "Potential use of date palm ash in cement-based materials," J. King Saud Univ.—Eng. Sci., pp. 0-5, 2017.
[2] A. Khellou, A. Kriker, A. Hafssi, K. Belbarka, and K. Baali, "Effect of the addition of by-product ash of date palms on the mechanical characteristics of gypsum-calcareous materials used in road construction," in AIP Conference Proceedings, vol. 1758, no. 1, p. 30005, 2016.
[3] B. A. Salami, M. A. Megat Johari, Z. A. Ahmad, and M. Maslehuddin, "Durability performance of Palm Oil Fuel Ash-based Engineered Alkaline-activated Cementitious Composite (POFA-EACC) mortar in sulfate environment," Constr. Build. Mater., vol. 131, pp. 229-244, 2017.
[4] Salih, M. A., Ali, A. A. A. and Farzadnia, N. Characterization of mechanical and microstructural properties of palm oil fuel ash geopolymer cement paste. Construction and Building Materials, 65, pp. 592-603, 2014.
[5] Mujah, D. Compressive strength and chloride resistance of grout containing ground palm oil fuel ash. Journal of Cleaner Production, 112, pp. 712-722, 2016.
[6] Johari, M. M., Zeyad, A. M., Bunnori, N. M. and Ariffin, K. S., 2012. Engineering and transport properties of high-strength green concrete containing high volume of ultrafine palm oil fuel ash. Construction and Building Materials, 30, pp. 281-288.

Example 4

Compressive Strength Analysis

The compressive strength was assessed at the ages of 3, 7, 14, 28, 90, 180, and 360 days of curing on 50 mm cube mortar specimens, as per ASTM C 109 and tested by means of compression testing machine at standard loading rate. Six specimens were tested at each age from each mix and their average reading is reported.

Figure 3:
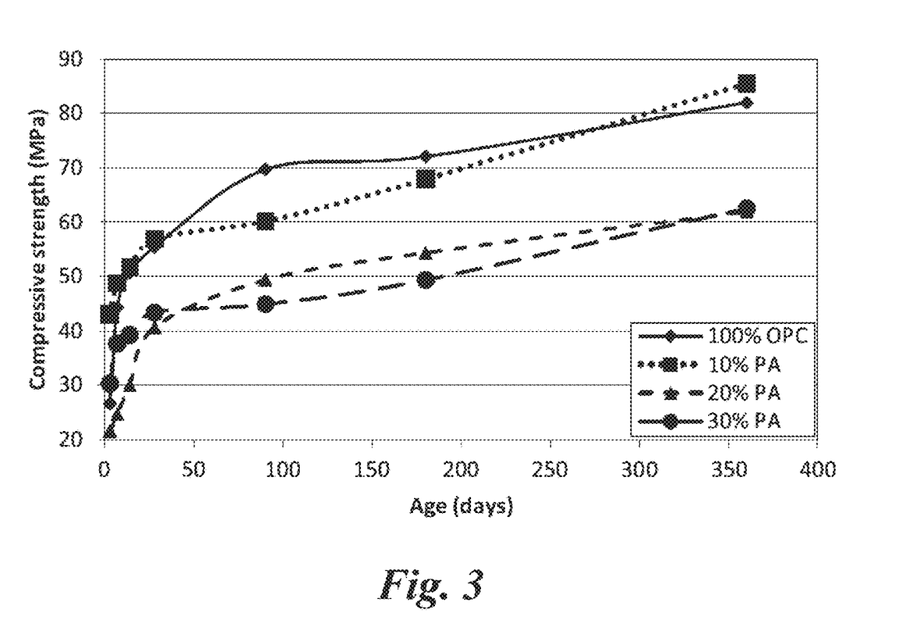
FIG. 3 is a graph illustrating compressive strength in various mortar mixtures.

FIG. 3 shows the compressive strength development in OPC, 10% PA, 20% PA and 30% PA mortar specimens with curing period. The highest early strength development was noted in mortar specimens prepared with 10% PA followed by 30% PA, 100% OPC and 20% PA specimens in decreasing order of efficiency. The 3-day compressive strength of OPC, 10% PA, 20% PA, and 30% PA mortar specimens was 26.6, 43.04, 21.5 and 30.3 MPa, respectively. However, the 28-day and 360-day strength development was found to be highest in 10% PA specimens and lowest strength was achieved in both 20% and 30% PA specimens having marginal difference. The 28-day compressive strength of 10% PA specimens was 56.8 MPA which is about 2.5%, 28.5% and 24% more than that of OPC, 20% PA and 30% PA specimens, respectively. Similarly, the 360-day strength in 10% PA mortar specimens was noted to be 85.5 MPa (about 33% gain from 28-day) which is 4%, 27.5% and 27% higher than that in OPC, 20% PA and 30% PA specimens, respectively. The increase in strength in 10% PA may be attributed to the continuous formation of additional C—S—H gel from hydration reaction till the later ages in mortar specimens, as mentioned in recent studies [Nasir, M., Al-Amoudi, O. S. B., Al-Gahtani, H. J., Maslehuddin, M., 2016. Effect of casting temperature on strength and density of plain and blended cement concretes prepared and cured under hot weather conditions. Constr. Build. Mater. 112, 529-537.; and Al-Amoudi, O. S. B., Al-Kutti, Walid. A., Ahmad, S., Maslehuddin, M., 2009. Correlation between strength and certain durability indices of plain and blended cement concretes. Cement Concr. Compos. 31, 672-676.— each incorporated herein by reference in its entirety]. Additionally, research has found from microstructural investigation that the addition of palm oil fuel ash contributes significantly to the mechanical strength by pore filling effects, and the formation of additional calcium (aluminate) silicate hydrate "CA(A)-SAH" [Yusuf, M. O., 2014. Strength and microstructure of alkali-activated binary blended binder containing palm oil fuel ash and ground blast-furnace slag. Constr. Build. Mater. 52, 504-510.— incorporated herein by reference in its entirety].

The mathematical equations for predicting the compressive strength of mortar specimens prepared with 100% OPC, 10%, 20% and 30% PA are statistically generated and presented in Table 4 which shows excellent correlation having $R^2$ value close to 1. The equations can be generalized as follows:

$$\sigma = C \cdot T^P \quad (1)$$

where σ represents compressive strength in MPa, C is the constant coefficient, T is the curing period between 3 and 360 days and P is the constant power.

TABLE 4

Constant and regression coefficient for compressive strength

| Mixture | C | P | $R^2$ |
|---|---|---|---|
| OPC | 26.305 | 0.2053 | 0.8987 |
| 10% PA | 37.19 | 0.1253 | 0.9386 |
| 20% PA | 16.726 | 0.2306 | 0.9771 |
| 30% PA | 27.75 | 0.1241 | 0.918 |

Example 5

Rate of Water Absorption Analysis

The rate of water absorption was measured after 28 days of curing. From each mix, 1 concrete cylindrical specimen having a 100 mm diameter and a 200 mm height was sliced into 5 discs, using a diamond blade saw cutter, and the middle three 400 thick discs were used for testing. Prior to testing, in accordance with ASTM C 1585, conditioning of the discs was carried out whereby specimens were placed into an oven under desiccator containing a saturated solution of potassium bromide to maintain the temperature of 50° C. and RH of 80±3% for 3 days. Thereafter, specimens were stored in sealed containers at a laboratory temperature of 23±2° C. for 15 days. Duct tape was utilized to seal the side surface of each before immersing it partly into water and weight readings were taken at a standard interval and duration. Three specimens from each mix were tested and their average values were reported.

Figure 4:
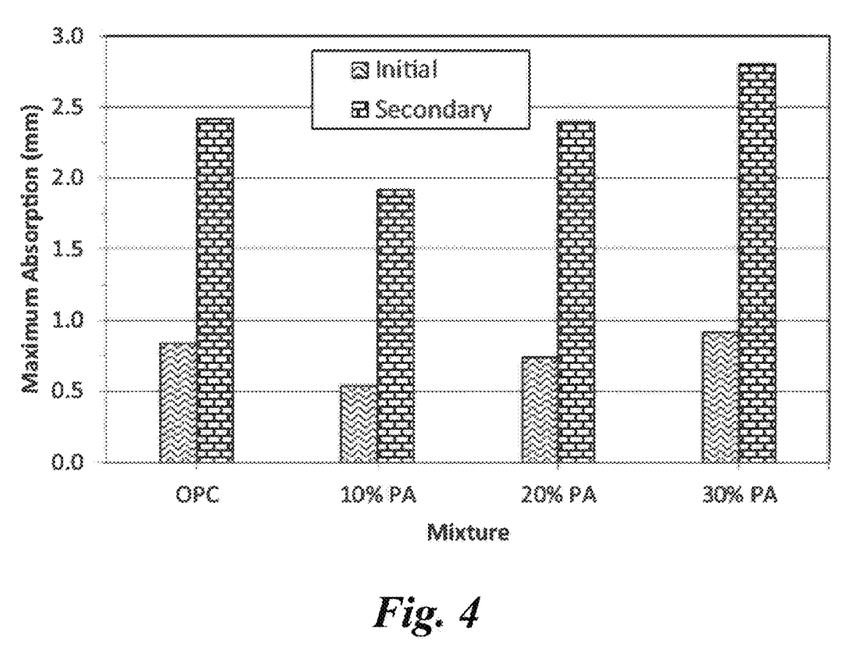
FIG. 4 is a graph illustrating maximum initial and secondary rates of water absorption in concrete samples.

FIG. 4 summarizes the maximum initial and secondary rate of water absorption in all concrete mixtures. It was noted that the minimum rate of water absorption both at an initial and final (i.e. secondary) stage was observed in 10% PA concrete specimens, followed by 20% PA, OPC and 30% PA specimens, in order of an increasing rate. The maximum initial rate of water absorption in 10% PA specimens was 0.54 mm which is about 35%, 27% and 41%, respectively lower than OPC, 20% PA and 30% PA specimens. However, the maximum secondary rate of water absorption in 10% PA specimens was recorded as 1.92 mm which is about 20.5, 19.5, and 31% lower than OPC, 20% PA and 30% PA specimens, respectively. It is also noted that the percentage increment of maximum rate of water absorption of each mixture from its initial stage to secondary absorption was minimum and maximum in 10% PA and 20% PA concrete specimens, respectively. The difference in maximum initial and secondary absorption was about 65.7%, 71.8%, 69% and 67.1% in OPC, 10% PA, 20% PA, and 30% PA concrete specimens, respectively.

Example 6

Rapid Chloride Permeability Analysis

Similarly to the rate of water absorption test, specimens for a rapid chloride permeability test (RCPT) were obtained having a size of 50 mm by 200 mm after a 28-day curing period. As per ASTM C 1202, the specimens were then conditioned such that the specimens were first kept in the desiccator and vacuum was created for 6 h then water is filled into the desiccator to soak specimens for 18 h. Thereafter, electric field was generated across the concrete disks by means of two cells filled with specific molarity solution of NaOH and NaCl which acts as anode and cathode, respectively when connected to 60 Volt power source. The current passing through the test specimens was monitored for 6 h and number of charges were recorded to qualitatively assess the indirect resistance of concrete to the chloride permeability. In RCPT as well, three specimens from each mix were tested and their average values reported.

Figure 5:
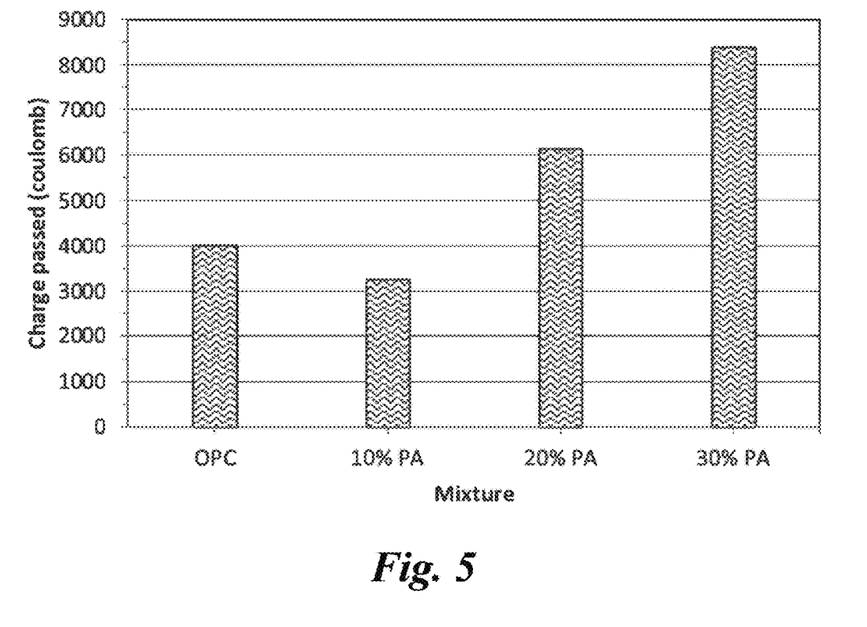
FIG. 5 is a graph illustrating the number of charges passed through various concrete mixtures using RCPT.

FIG. 5 shows the average number of charges passed through each concrete mixture. It was evident the concrete specimens prepared with 10% PA showed maximum resistance to the permeability of chloride ions followed by the specimens prepared with 100% OPC, 20% PA, and 30% PA, respectively with a decreasing order of efficiency. The average of the total number of charges passed through OPC, 10% PA, 20% PA and 30% PA was 4007, 3254, 6132 and 8379 coulombs, respectively. The number of charges passed through 10% PA concrete specimens was about 19%, 47% and 61% less as compared to OPC, 20% PA and 30% PA specimens, respectively.

The improved resistance to water and chloride ion penetration in 10% PA concrete specimens may be directly related to the denser microstructure and pore interconnection, as depicted in the compressive strength results of 10% PA. Moreover, research has revealed that both unburned carbon content and density have a direct relation in enhancing the durability and resistance to corrosion that ultimately affects the fluid transportation within the microstructure of concrete [Zeyad, A. M., Johari, M. A. M., Tayeh, B. A., Yusuf, M. O., 2016. Efficiency of treated and untreated palm oil fuel ash as a supplementary binder on engineering and fluid transport properties of high-strength concrete. Constr. Build. Mater. 125, 1066-1079—incorporated herein by reference in its entirety].

Example 7

Thermogravimetric Analysis (TGA)

TGA Experimental Results of OPC and Specimen with PA Replacements after 90 Days of Curing In order to determine the hydration reaction products in the pastes, thermogravimetric analysis (TGA) was conducted for all pastes using a Shimadzu TGA-50 Thermo Gravimetric Analyzer. The samples were heated in the range of 20 to 600° C. at a rate of 10° C./min. The CSH gel and $Ca(OH)_2$ was estimated from the weight loss measured in the TG curve between the initial and final temperature of the corresponding DTG peak.

Figure 6:
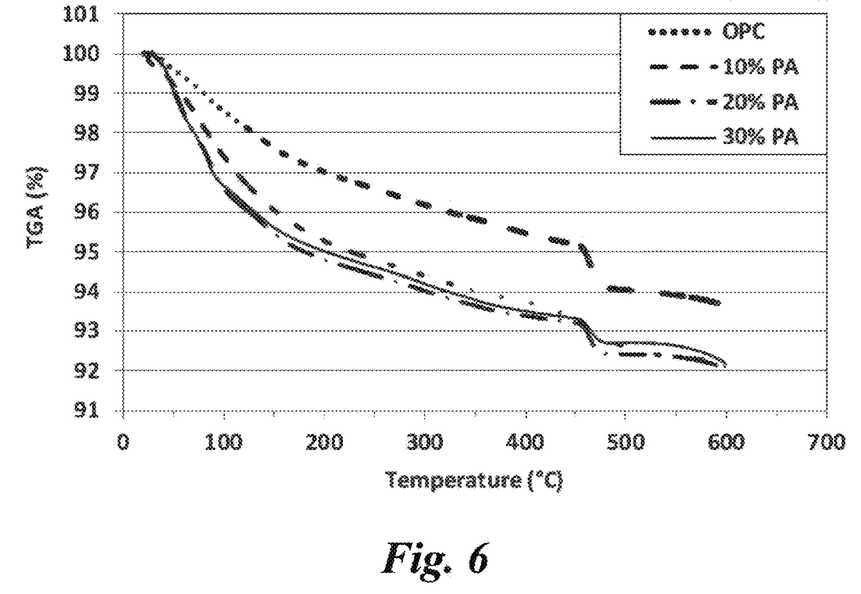
FIG. 6 is a graph illustrating the TGA curve of OPC and PA pastes at 90 days.

FIG. 6 presents the thermogravimetric analysis (TGA) result for control and palm ash (PA) paste in which the weight loss (%) is measured at the age of 90 days. It could be observed from the figure that between a temperature of 20° C. and 450° C., the replacement of PA increased the weight loss compared to OPC pastes. This indicates that more hydration products presence in PA pastes compared to OPC. Further details could be found in Table 5 in which the TGA results was classified in two phases: (a) Phase 1 in which the decomposition of calcium silicate hydrates and carboaluminate hydrates takes place between temperature of 110-300° C.; (b) phase 2 in which the decomposition of calcium hydroxide undergoes between temperature of 450-550° C. From Table 5 it can be noted that the highest weight loss in phase 1 was found in pastes with 10% replacement of PA which is 23% more than OPC pastes and this indicates that secondary pozzolanic reaction was occurred between SiO2 and Ca(OH)2 and this could be noted in a reduction of the presence of $Ca(OH)_2$ in 10/o replacement of PA pastes which is about 29% less than OPC pastes. The results also showed that with increase of PA with more than 10% there is a decrease in the hydrated products which indicates that no significant improvement in the hydrated products for PA replacement more than 10%.

TABLE 5

Weight loss of OPC and PA pastes at 90 days

| Paste Type | Total weight loss (%) | Phase 1 1.10-300° C. decomposition of C-S-H and C-A-H | | Phase 2 450-550° C. decomposition of Ca(OH)$_2$ | |
|---|---|---|---|---|---|
| | | WL % | (WL/WL in OPC) | WL % | (WL/WL in OPC) |
| OPC | 4.31 | 2.04 | 1.00 | 1.27 | 1.00 |
| 10% PA | 4.54 | 2.50 | 1.23 | 0.90 | 0.71 |
| 20% PA | 3.85 | 2.18 | 1.07 | 0.86 | 0.68 |
| 30% PA | 3.71 | 2.14 | 1.05 | 0.69 | 0.54 |

The mechanical, durability and microstructural properties of PA based mortar and concrete in terms of compressive strength, rapid chloride penetration test, rate of water absorption, and TGA was performed. The waste material date palm ash has been introduced as a competent binder in enhancing mortar and concrete properties. Replacement of 10% PA has increased compressive strength up to 360 days than conventional 100% OPC concrete. And the regression model successfully predicts the compressive strength of each mixture up to 360 days. Chloride ions penetrability is improved with 10% PA replacement comparing with other mixture, by providing moderate penetrability compared to high in OPC. That means it will protect reinforcement bars better than other mixtures from corrosion. 10% PA replacement resulted lowest rate of water absorption. That ensures reduction in permeability of deleterious substances into concrete. Date palm ash may be effectively utilized as construction material in reducing the $CO_2$ emission into the atmosphere and minimizing the cost of construction without compromising the service life of the structures.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present invention is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A concrete or mortar composition, comprising:
   a cementitious binder material comprising Portland cement and 1-50 wt % date palm ash relative to the total weight of the cementitious binder material;
   a coarse aggregate;
   a fine aggregate; and
   water;
   wherein the cementitious binder material is present at 200-500 kg per m$^3$ of the concrete or mortar composition.

2. The concrete or mortar composition of claim 1, wherein the cementitious binder material comprises 5-15 wt % of the date palm ash relative to the total weight of the cementitious binder material.

3. The concrete or mortar composition of claim 1, wherein the date palm ash comprises 30-40 wt % $SiO_2$ relative to the total weight of the date palm ash.

4. The concrete or mortar composition of claim 1, wherein the date palm ash comprises 10-15 wt % of CaO relative to the total weight of the date palm ash.

5. The concrete or mortar composition of claim 1, wherein the date palm ash comprises 0.1-1.0 wt % of $Fe_2O_3$ relative to the total weight of the date palm ash.

6. The concrete or mortar composition of claim 1, wherein the date palm ash comprises 5-10 wt % of MgO relative to the total weight of the date palm ash.

7. The concrete or mortar composition of claim 1, wherein the date palm ash comprises 0.1-1.0 wt % of $Al_2O_3$ relative to the total weight of the date palm ash.

8. The concrete or mortar composition of claim 1, wherein the date palm ash has a specific gravity of 2.0-2.5.

9. The concrete or mortar composition of claim 1, wherein the date palm ash has a maximum particle size of less than 0.2 mm.

10. The concrete or mortar composition of claim 1, wherein the Portland cement is Ordinary Portland cement (OPC) Type I.

11. The concrete or mortar composition of claim 1, wherein a weight ratio of the fine aggregate to the coarse aggregate is in a range of 0.5-0.8.

12. The concrete or mortar composition of claim 1, wherein the coarse aggregate has particle size of 3-25 mm, and the fine aggregate has a particle size of less than 0.5 mm.

13. The concrete or mortar composition of claim 12, wherein the coarse aggregate is crushed limestone and the fine aggregate is dune sand.

14. The concrete or mortar composition of claim 1, wherein the weight ratio of the water to the cementitious binder material is 0.2-0.6.

15. The concrete or mortar composition of claim 1, wherein the cementitious binder material comprises 5-15 wt % of the date palm ash relative to the total weight of the cementitious binder material, and which has at least one selected from the group consisting of
   a 3 day compressive strength of 35-50 MPa after setting,
   a 28 day compressive strength of 56-60 MPa after setting, and
   a 360 day compressive strength of 83-90 MPa after setting.

16. The concrete or mortar composition of claim 1, wherein the cementitious binder material comprises 5-15 wt % of the date palm ash relative to the total weight of the cementitious binder material, and which has at least one selected from the group consisting of
   a maximum initial rate of water absorption of 0.25-0.72 mm/s after setting,
   a maximum secondary rate of water absorption of 1.75-2.25 mm/s after setting.

17. The concrete or mortar composition of claim 1, wherein the cementitious binder material comprises 5-15 wt % of the date palm ash relative to the total weight of the cementitious binder material, and which has an average chloride permeability of 2,000-3,500 coulombs after setting.

18. A cured concrete or mortar product comprising the composition of claim 1 in cured form.

19. The cured concrete or mortar product of claim 18, wherein the cementitious binder material comprises 5-15 wt % of the date palm ash relative to the total weight of the cementitious binder material, and which has at least one selected from the group consisting of a 3 day compressive strength of 35-50 MPa,
a 28 day compressive strength of 56-60 MPa, and
a 360 day compressive strength of 83-90 MPa.

20. The cured concrete or mortar product of claim 18, wherein the cementitious binder material comprises 5-15 wt % of the date palm ash relative to the total weight of the cementitious binder material, and which has at least one selected from the group consisting of a maximum initial rate of water absorption of 0.25-0.72 mm/s, a maximum secondary rate of water absorption of 1.75-2.25 mm/s, and an average chloride permeability of 2,000-3,500 coulombs.

* * * * *